July 9, 1968 G. S. BURR 3,391,572
CONTROLLING IN MATERIALS TESTING
Filed Jan. 13, 1966
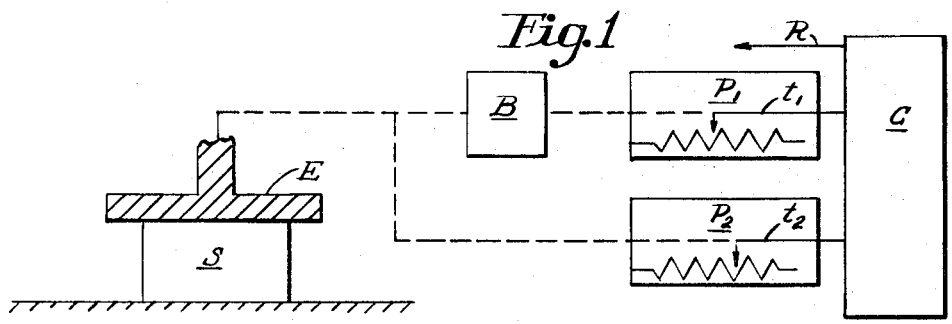
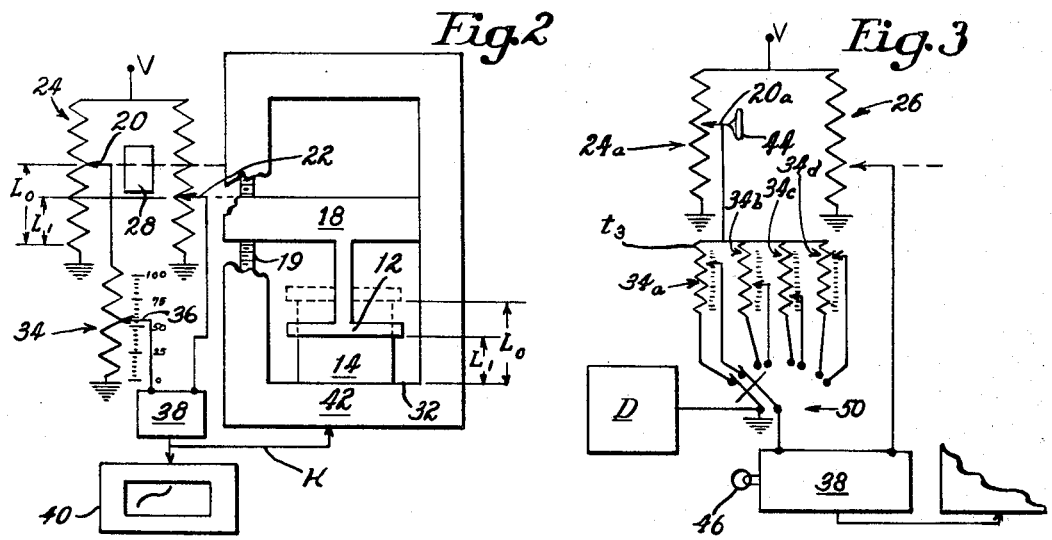
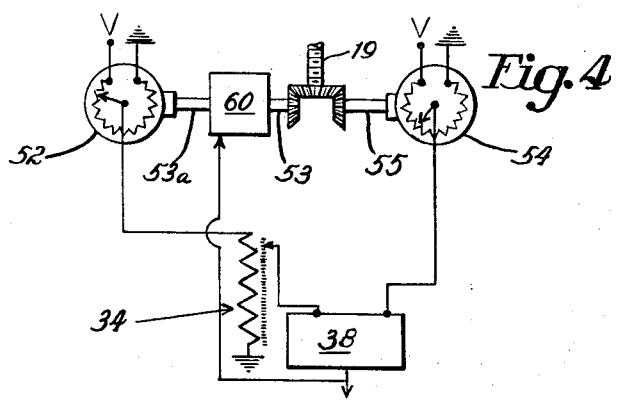

United States Patent Office 3,391,572
Patented July 9, 1968

3,391,572
CONTROLLING IN MATERIALS TESTING
George Sterling Burr, Wellesley Hills, Mass., assignor to Instron Corporation, Canton, Mass., a corporation of Massachusetts
Filed Jan. 13, 1966, Ser. No. 520,509
1 Claim. (Cl. 73—88.5)

ABSTRACT OF THE DISCLOSURE

For a testing machine means for establishing a test control point based upon the previously undetermined length of a specimen and comprising first, second and third potentiometers and a null detector, the tap of the first potentiometer being set at a point corresponding to the length of the unstrained specimen, the tap of the second potentiometer being movable in response to movement of the testing machine loading member, the third potentiometer being connected to the tap of the first potentiometer, and the null detector being connected to the taps of the second and the third potentiometer.

---

This invention relates to testing materials. More particularly it relates to testing apparatus for specimens having a previously undetermined characteristic upon which it is wished to base a test, such as occurs where specimens of varying length are encountered.

The principal object of the invention is to provide apparatus for automatically establishing test control points based upon a previously undetermined physical characteristic of the specimen.

A more specific object of the invention is to provide apparatus for establishing test control points based upon a percentage of a characteristic length of the specimen, where that length has not previously been determined.

Other objects are to provide: apparatus capable of establishing a series of test control points based upon the desired physical characteristic of the specimen; apparatus capable of automatic operation throughout a test program; and apparatus capable of achieving each of the above objects in a simple, inexpensive and reliable manner.

According to the invention a testing element of a testing machine is linked to a circuit consisting of a pair of potentiometers. The setting of one potentiometer is determined from the testing element with reference to the characteristic of the specimen upon which the test is to be based. Thus the tap of the first potentiometer may be set by the height of a compressive loading element of a testing machine when it makes contact with a specimen, defining the gauge length of the specimen.

The setting of the second potentiometer continues to be directly responsive to the changing condition of the testing element as the test proceeds. Thus this setting may be changed directly with the changing height of the compressive loading element mentioned above, this setting reflecting the compressed length of the specimen at any time.

A power source applies a predetermined voltage across each of the potentiometers, and the taps of the two potentiometers are connected to a comparing circuit. This circuit is adapted to compare the voltages and emit the desired control signal when a predetermined relationship occurs between the voltages.

Advantageously this comparing circuit consists of a third potentiometer and a comparator device such as a null detector. The first potentiometer energizes the third, so that the voltage on the tap of the latter represents a percentage of the voltage on the tap of the former. The comparator device senses the taps of the second and third potentiometers and is adapted to signal when the voltages on the taps become equal, or attain some predetermined relationship.

Advantageously a number of the comparing circuits are provided, capable of defining different test points based upon the initial characteristic of the specimen, and a switching device, either manual or programmed, can select the test points in succession to carry out a desired test program.

When each test control point is reached a reading may be taken and/or the signal may be employed to switch the testing machine to its next operation.

The invention, including other objects and features, will be explained with reference to the embodiments of the drawings wherein FIG. 1 is a diagram of a testing machine which incorporates the invention;

FIG. 2 is a partially diagrammatic view of an embodiment of the invention capable of producing a test control point in accordance with a preselected percentage of gauge length of a specimen;

FIG. 3 is a diagrammatic view illustrating a preferred arrangement by which a series of test points may be established in succession;

FIG. 4 is a partially diagrammatic view of a preferred drive arrangement in an embodiment of the invention.

Referring to FIG. 1 a loading element E for a testing machine, is shown engaged with a test specimen S.

The loading element may be of a conventional type, capable of applying compressional or tensional loads to generate in the system a mechanical or electrical signal indicative of a load, positional, or other condition of the element.

The signal, preferably a mechanical motion as denoted by the dashed lines when indicative of position, is transmitted to a pair of potentiometers $P_1$ and $P_2$, controlling the positions of the taps $t_1$, $t_2$ along the extent of their resistors. The mechanical input to potentiometer $P_1$ is applied through a lock B which is capable of fixing the position of the tap $t_1$. The setting of tap of potentiometer $P_2$ is controlled directly by the loading element.

The outputs $t_1$ and $t_2$ are applied to a comparing circuit C, which generates a signal R indicative of a predetermined relationship between the values of the voltages of the two inputs. This signal R serves as a test control signal to the mechanism of the testing machine. For example it can stop the machine, or reverse the movement of the loading element, or cause the recording of the event. The specific use depends upon the type of test to which the specimen is to be subjected.

Referring to FIGURE 2, a testing machine adapted for compressive testing of a specimen 14 is shown. The compressive loading element 12 is carried by a cross-head 18 which is driven by screws 19 in the conventional manner.

The cross-head 18 is adapted to drive potentiometer taps 20 and 22 of potentiometers 24 and 26 respectively, as indicated by the dashed lines. Potentiometer tap 20 is driven through clutch-brake 28, the latter being responsive to initial contact of the loading element 12 with the specimen 14 to fix the setting of the tap.

For purposes of illustration the potentiometers are identical and have the same voltage applied across them, as indicated. They are aligned, and at the commencement of the test their taps are located at the same relative positions. The head 12 is lowered moving both taps 20, 22 down their resistors until the element 12 comes into contact with the specimen 14, as shown in the dotted line position. At that point the distance $L_0$ between the element 12 and the platform 32 is the gauge length of the specimen, and the voltage applied to tap 20 represents that gauge length, $L_0$. At this point clutch-brake 28 is actuated, for instance by a micro switch responsive to contact with the specimen, locking tap 20 in its position.

The head continues to move down, carrying tap 22 with it until a position is reached where the reduced length $L_1$ bears the desired relationship to the gauge length, thus $$L_1 = fL_0$$

In this preferred embodiment the function $f$ constitutes a selectable percentage. Advantageously this is achieved by third potentiometer 34 having one terminal connected in common with the first potentiometer 24, and the other terminal connected to the tap 20. The voltage on tap 36 of potentiometer 34 is linearly dependent upon its selected position along the resistor, and represents a percentage of the voltage on tap 20. Since the voltage on tap 20 represents the gauge length, tap 36 reads the selected percentage of gauge length, $fL_0$.

Tap 36 is connected to a null detector 38, to which is also connected the tap 22 of potentiometer 26. The voltage on this tap varies as the head moves, and when it reaches the value $L_1 = fL_0$ there is no voltage difference between taps 36 and 22, the null detector detects this condition and generates test control signal R. As illustrated this signal is applied to recorder 40 where it marks the point on the load-time chart that corresponds to the test control point. The signal is also applied to the drive mechanism 42 of the test machine to cause the next phase of the test program to be entered.

Referring to the embodiment of FIG. 3 two identical potentiometers 24a and 26 are provided, similar to FIG. 2. Here however the tap 20a of the first potentiometer 24a is not driven directly by the head, but is provided with a handle 44. A third potentiometer 34a is provided similar to potentiometer 34 of FIG. 2.

For the purpose of setting the gauge length into potentiometer 24a, the tap of the third potentiometer $t_3$ is set to the 100% reading at the beginning of the resistor. Thus when the first two potentiometers, 24a and 26, have equal settings, the same voltage occurs on their taps 20a, 22, which the null detector detects. An indicator light 46 is provided, which is lighted whenever a null is detected.

With this apparatus the gauge length can be set in by lowering element 12 until it makes contact with the specimen, the position of tap 22 of the second potentiometer thus representing gauge length. The handle 44 is moved to adjust the location of tap 20a until the null light 46 comes on, indicating that tap 20a has the same setting as tap 22, and handle 44 is locked. The test program can then be conducted.

Another feature of FIG. 3 is the provision of a set of potentiometers 34a, 34b, 34c, 34d adapted to receive different settings and a switch 50 capable of selecting a potentiometer from this set, depending upon the control point desired. Advantageously the switch 50 is controlled by a program device D, which enables a complete program to be carried out based upon the gauge length or other desired characteristic represented by the potentiometers.

Thus where it is desired to subject a specimen to repeated loadings between two conditions, for example deformations to 80% gauge length and 50% gauge length, it is merely necessary to make the appropriate setting on potentiometers 34a and 34b, and establish the program to move the switch alternately between the two positions in response to null signals received from the null detector.

Referring to FIG. 4 there is illustrated a preferred means of driving the first and second potentiometers. In this embodiment the potentiometers 52, 54 are of the rotary type and drive shafts 53, 55 are driven by a take off from the lead screw 19 of the testing machine.

The rotary movement of shaft 53 is transmitted to potentiometer 52 through a position control means preferably comprising a clutch-brake and return device 60. This is adapted to declutch the driven shaft 53a of the potentiometer from the drive shaft 53, locking shaft 53a. At the same time a motion storage spring in device 60 is connected to shaft 53 to store the further motion of shaft 53, as the head moves beyond the gauge length position. The brake-return device is adapted to be unlocked after the test, and the storage spring is adapted to apply the stored motion to shaft 53a of the potentiometer, thus realigning its setting with that of potentiometer 54 and the loading head to prepare for a further test.

While compressive testing in accordance with gauge length of a specimen is preferred, the invention in its broader aspects is applicable to tensional tests, to other characteristic lengths, and indeed may be useful in conjunction with other test conditions, such as the load on the specimen.

What is claimed is:
1. For a testing machine of the type having a movable loading element for applying load to a specimen under test, means for establishing a test control point based upon the previously undetermined length of the particular specimen being tested, said means comprising:

first and second potentiometers connected to a source of electrical potential for applying equal voltages thereacross;

means connected to the taps of said first and second potentiometers and adapted for connection to said movable loading element for moving the tap of second potentiometer in response to movement of said movable loading element and for moving the tap of said first potentiometer in response to movement of said movable element until its position corresponds with said length of said specimen and fixing the tap of said first potentiometer in said corresponding position;

a third potentiometer connected to the tap of said first potentiometer and to ground, the tap of said third potentiometer being adjustable for presetting at a position representative of the desired deflection of said specimen and the voltage on the tap of said third potentiometer being a preset percentage of the voltage on the tap of said first potentiometer; and a null detector connected to the taps of the said second and third potentiometers for comparing the voltages thereon and generating a test control signal when the voltages on said two taps are equal.

References Cited

UNITED STATES PATENTS

| | | | |
|---|---|---|---|
| 3,067,607 | 12/1962 | Crane et al. | 73—89 |
| 3,076,603 | 2/1963 | Gruber | 73—89 |

RICHARD C. QUEISSER, *Primary Examiner.*

JAMES H. WILLIAMSON, *Assistant Examiner.*